United States Patent [19]
Aulhorn et al.

[11] 3,894,184
[45] July 8, 1975

[54] TIME DIVISION MULTIPLEX SUBSCRIBER CIRCUIT

[75] Inventors: Herbert Aulhorn, Leonberg; Harry Schulz, Stuttgart, both of Germany

[73] Assignee: International Standard Electric Corporation, New York, N.Y.

[22] Filed: Apr. 8, 1974

[21] Appl. No.: 458,634

[30] Foreign Application Priority Data

Apr. 27, 1973 Germany .......................... 2321469

[52] U.S. Cl. .............................................. 178/50
[51] Int. Cl. ........................................... H04l 5/00
[58] Field of Search ........ 179/15 BY, 15 BW, 15 A; 178/50, 53, 53.1

[56] References Cited

UNITED STATES PATENTS 3,337,687 8/1967 Normand ............................ 178/53
3,502,808 3/1970 Brown .......................... 178/53.1 R
3,633,164 1/1972 Hynes ................................ 178/50

*Primary Examiner*—Ralph D. Blakeslee
*Attorney, Agent, or Firm*—John T. O'Halloran; Menotti J. Lombardi; Richard A. Menelly

[57] ABSTRACT

A time-division-multiplex subscriber circuit provides the synchronous transfer of dial signals and teleprinter character signals into a time-division-multiplex system by means of a buffer and a pair of flip-flop devices in response to differences in the changes of polarity of the signals and at least one counter in cooperation with a divider for dividing the clock rate of the multiplex system down to the character signal repetition rate when one of the flip-flop devices is energized. The character signal repetition rate also controls the clock input of the buffer storage device so that the pair of flip-flop devices, the counter and divider become reset when the counter has reached a predetermined counting value.

5 Claims, 7 Drawing Figures

TIME DIVISION MULTIPLEX SUBSCRIBER CIRCUIT

BACKGROUND OF THE INVENTION

For the transfer of a digital message into the transmitter-distributor cycle of a time-division-multiplex system, the message to be transmitted must be in synchronism with the repetition rate of the time channel used. To this end, the equipment transmitting the message must be synchronized with the repetition rate of the time channel, or, if the message itself has no repetition rate of its own, it must be sampled by the time channel in a time-transparent manner, i.e. at a high sampling rate in accordance with Shannon's sampling theorem.

Plesiosynchronous transmissions, where the repetition rate of the message and time channels nearly agree, occupy an intermediate position. This is the case with the teleprinter characters according to the CCITT teleprinter code No. 2 as typical representatives of a start-stop transmission if a suitable time-channel repetition rate is chosen. If transmitted at 50 bauds, such a teleprinter character consists of a 20 ms start element, 5 character elements each 20 ms long, and a stop element ≥ 30 ms long, the starting point of the individual character being completely indefinite even if followed by the character at the 20 ms period. In such a case it is known in the art to use a buffer for the synchronous transfer of the signals into the time-division-multiplex circuit (K.Steinbuch: "Taschenbuch der Nachrichtenverarbeitung," Springer, 1967, p. 829). To permit the characters to be transmitted bit by bit, their individual bits must be temporarily stored for one bit period because of the indefinite position of the starting point.

As a rule, it will be necessary to transmit in the same time channel, in addition to the teleprinter characters, dial signals. If the dialed digits are transmitted as teleprinter characters, no sequencing difficulties will be encountered. If, however, dialing is effected according to a counting code by means of a dial, the mean length of a dial pulse will be 100 ms and can be interpreted as a start element of 60 ms and a stop element of 40 ms, i.e., as a character of 5 bits each 20 ms long. Here, too, the starting point of the first dial pulse of a digit is completely indefinite. To complicate things, considerable tolerances result from the mechanical generation of the dial pulses by means of the dial switch. For example, the length of the dial pulse with a following space may vary between 90 and 110 ms, and the relation between the start and the stop element between 1.3 : 1 and 1.9 : 1. Hence, the extreme values are 51 : 39 ms = 1.3 : 1 at 90 ms dial-pulse length, and 72 : 38 ms = 1.9 : 1 at 110 ms dial-pulse length.

SUMMARY OF THE INVENTION

The present invention provides a TDM subscriber circuit which matches the teleprinter characters to the channel repetition rate and permits dial signals to be transferred bit by bit into the transmitter-distributor cycle according to the counting code and within the tolerances of the dial signals.

This is accomplished by means of a time-division-multiplex system and a subscriber circuit which provides a storage buffer for receiving and storing both dial and teleprinter character signals, a counting device for determining the number of multiplex clock pulses required for the synchronous transfer of said dial and teleprinter characters into said time-division-multiplex system, wherein a particular counting value is determined by sensing the direction of the change in polarity occurring with said signals at the beginning of a counting cycle.

The fact that the TDM subscriber circuit permits also the dial signals to be converted, according to the counting code and despite their wide tolerances, in such a manner that they can be transferred into the transmitter-distributor cycle bit by bit eliminates the need for time-transparent sampling, i.e. for sampling at a high rate; it is sufficient to perform one sampling operation for each bit of the incoming signal, each dial pulse of a dial signal being regarded as a sequence of 5 bits. In this manner, a saving in bandwidth is achieved at a fixed number of channels of the time-division-multiplex system, or, as compared to sampling according to Shannon, twice the number of time channels can be accommodated within a given transmission bandwidth. Furthermore, matching to the repetition rate of the time channel is effected only at one point, namely at the transmitting end, at a low cost.

BRIEF DESCRIPTION OF THE DRAWINGS

The invention will now be described in detail with reference to the accompanying drawings, in which.

DESCRIPTION OF THE PREFERRED EMBODIMENT

Figure 1:
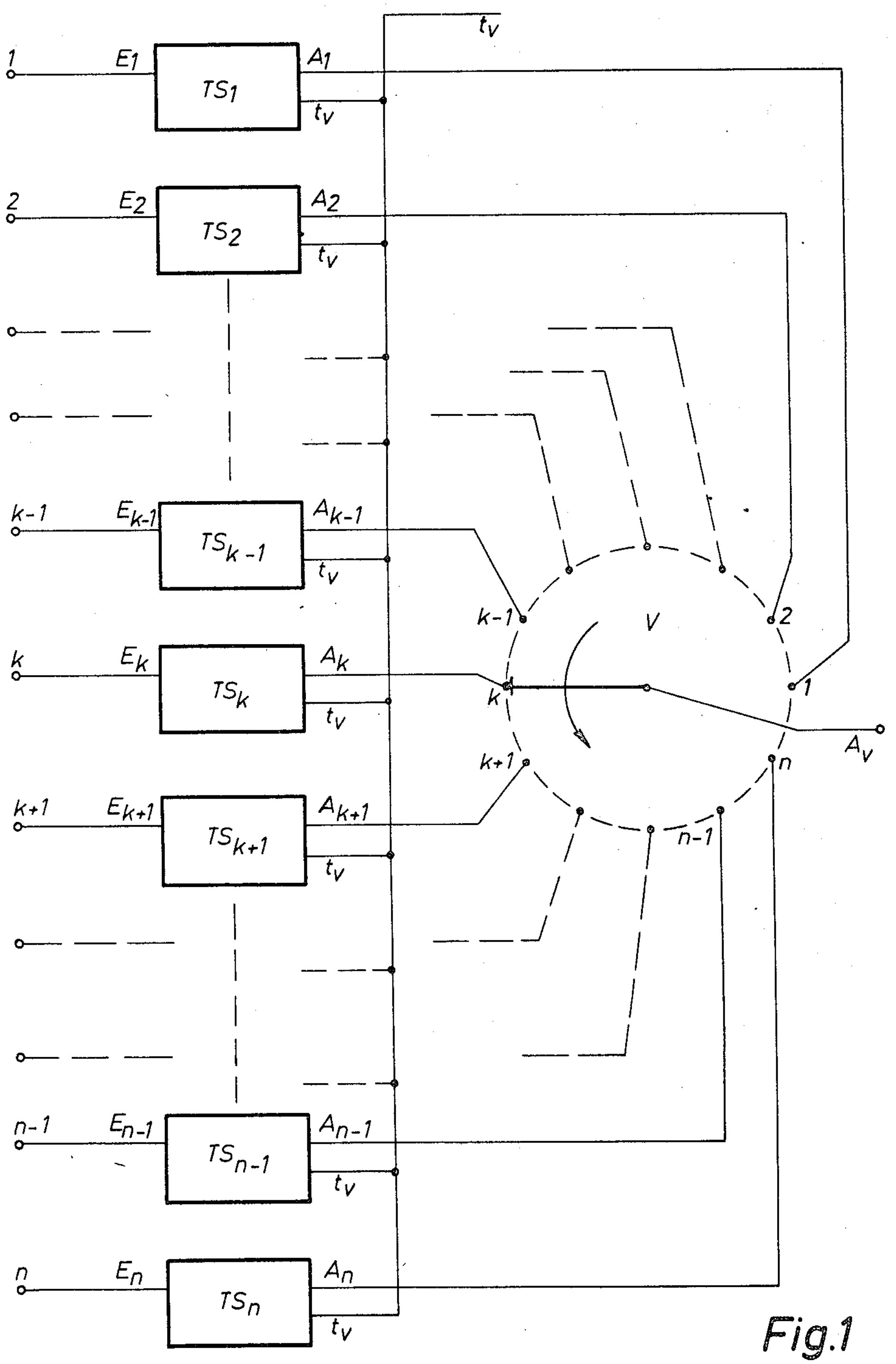
FIG. 1 is a block diagram showing the transmitting end of a TDM system with n subscriber circuits.

FIG. 1 shows the basic arrangement of the transmitting end of a TDM system in which the digital signals are stored, for the synchronous transfer into the transmitter-distributor, in a buffer contained in the TDM subscriber circuit. Each of the n incoming teleprinter subscriber lines (1...k...n) is allotted a TDM subscriber circuit ($TS_1 ... TS_n$) whose output is sampled by the transmitter-distributor (V), it being irrelevant whether the signals are transmitted directly over the teleprinter subscriber lines or via a carrier frequency by means of a 4-wire VFT equipment and demodulated only in front of the subscriber circuit.

The invention is based on the following considerations. Teleprinter characters according to the CCITT teleprinter code No. 2 and dial signals according to the counting code both begin with a 1 → 0 transition, i.e., at their beginning it is impossible to distinguish one from the other because the length of the first character element represents no criterion, either, as both the first element of a dial signal and the first element of the teleprinter characters H, M, and N are 60 ms long. Since, however, as mentioned hereinbefore, a teleprinter character consists of a start element 20 ms long, 5 character elements occupying a time of 20 ms each, and a stop element of ≥ 30 ms, i.e., is at least 150 ms long, and must be in the stop state from 120 ms in any case, while a dial signal according to the counting code, which signal consists of at least two dial pulses each followed by a space, must be in the start state in the period 110–140 ms after the beginning of the dial signal if all tolerances are considered, the type of character can be recognized by the direction of the change of polarity following an instant T between 120<T<140 ms after the beginning of the character. If this change is a "1 → 0" transition, the character is a teleprinter character; in case of a "0 → 1" transition, the character is a dial signal according to the counting code. These changes of polarity can be processed as a criterion. While in the case of a teleprinter character only the stop element is not an integral multiple of 20 ms, in the case of dial signals both marks and spaces, i.e., both start and stop elements, may be no integral multiples of 20 ms.

Figure 2:
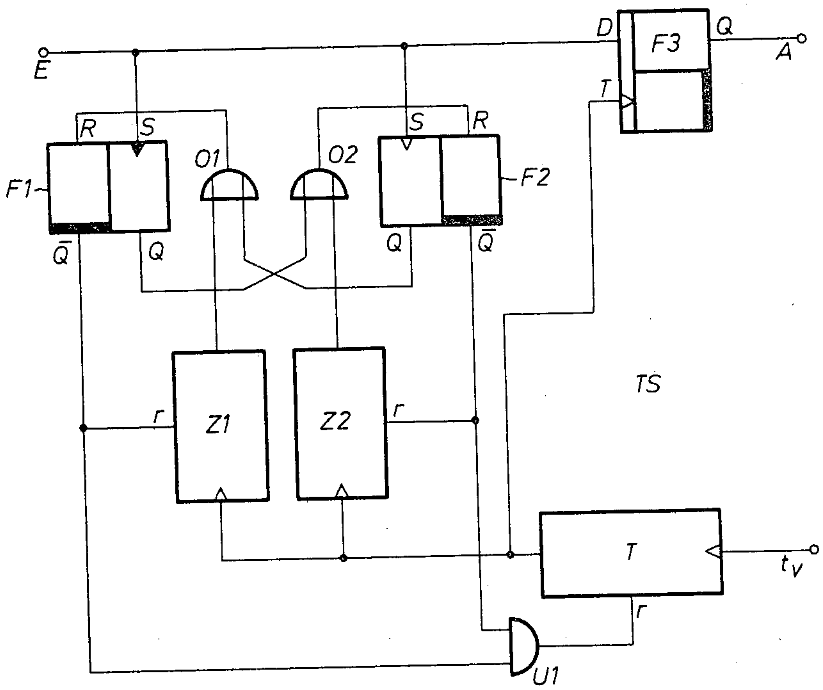
FIG. 2 is a block diagram showing a subscriber circuit according to the invention with two counters.

FIG. 2 shows an example of the arrangement of a TDM subscriber circuit according to the invention and corresponding to the subscriber circuits $TS_1 \ldots TS_n$ of FIG. 1. The incoming teleprinter characters or dial signals are applied to the set inputs S of two flip-flops F1 and F2. If the two flip-flops F1 and F2 are not blocked by a 1 on their reset inputs R, a "0 → 1" transition will take place at the outputs Q of F1 and F2, and a "1 → 0" transition will take place at the outputs $\bar{Q}$ if a "1 → 0" transition takes place at the reset input of F1, and a "0 → 1" transition at the reset input R of F2. The reset input r of a first counter Z1 and one input of an AND-circuit U1 are now connected to the $\bar{Q}$ output of the first flip-flop F1, while the reset input *r* of a second counter Z2 and the other input of the AND-circuit U1 are connected to the $\bar{Q}$ output of the second flip-flop F2. The output of the AND-circuit U1 is connected to the reset input r of a divider T which divides the multiplex repetition rate $t_F$ of, e.g., 3,200 Hz down to the character repetition rate of 50 Hz, which equals a 20 ms period, in such a manner that, after the reset input r has been enabled by a 0, there is first a 10 ms space, which is followed by a positive 10 ms pulse, i.e., that a square wave with a unity mark-to-space ratio and a 20 ms period is obtained until a 1 is again applied to the reset input *r* of the divider. This square wave train is applied to those inputs of the two counters Z1 and Z2 which respond only to "0 → 1" transitions, and to the clock input T of the buffer F3, which is also a flip-flop, to whose D input the teleprinter characters or dial signals are applied.

Thus, the individual bits of teleprinter characters are transferred to the Q output of the buffer F3 with a 10 ms delay as compared to their appearance on the D input, i.e., in the case of teleprinter characters the bits applied to the D input are sampled in their time middle, and this value is stored in the buffer F3 up to the next clock pulse. This is also the case with 60 : 40 ms dial signals. If other permissible conditions occur, this will lead to shifts in the sampling instant as will be seen from FIG. 3. If the divider T is blocked by application of a 1 to its reset input, the character state of the last sampled bit will remain stored as a continuous signal in the buffer F3 until the divider T is enabled again.

It must now be shown how the two flip-flops F1 and F2 interlock if a 1 appears at the Q-output of one flip-flop. The reset inputs R of the two flip-flops F1 and F2 are connected to the outputs of OR-circuits 01 and 02, respectively. One of the two inputs of the OR-circuit 01 is connected to the output of the counter Z1, while the other input is connected to the Q-output of the flip-flop F2. Analogously, one input of the OR-circuit 02 is connected to the output of the counter Z2, while the other input is connected to the Q-output of the flip-flop F1.

If both flip-flops F1 and F2 are reset, a 0 will appear at their Q-outputs. Since, in that case, both counters Z1 and Z2 will deliver a 0 at their outputs, each of the two inputs of the OR-circuits 01 and 02 will receive a 0 which results in a 0 appearing at the outputs of these OR-circuits and thus also on the reset inputs R of the flip-flops F1 and F2, the latter being thereby unblocked and one of them being capable of changing state depending on whether a "1 → 0" or a "0 → 1" transition occurs at their set inputs S. If a "1 → 0" transition occurs, the flip-flop F1 will change state and a 1 will appear at its Q-output and thus also at one input and the output of the OR-circuit 02; the flip-flop F2 is blocked. Since a 0 now appears at the $\bar{Q}$ output of the flip-flop F1, the divider T is started (0 and 1 are applied to the inputs of the AND-circuit U1 and, consequently, a 0 appears at its output), and the counter Z1 is unblocked. When the counter Z1 reaches its predetermined final value, a 1 will appear at its output. 1 and 0 are present at the inputs of the OR-circuit 01; consequently, a 1 appears at its output whereby the flip-flop F1 is reset, the 1 and the $\bar{Q}$ output of F1 also clearing and blocking the counter Z1 and the divider T. The 0 at the Q output of the flip-flop F1, however, enables the flip-flop F2 again. In case of a "0 → 1" transition, the flip-flop F2 and thus the divider T and the counter Z2 respond analogously, the sequence of operations being the same. The question to which counting values the counter Z1 anad Z2 are appropriately preset will now be discussed with the aid of FIG. 3. FIG. 3 shows the pulse diagrams for four examples A...D. A shows the transfer of teleprinter characters into the transmitter-distributor cycle, the two characters S and U having been chosen by way of example. B...D show the transfer of dial signals, B showing the transfer of dial signals with a mark-to-space ratio of 1.5 : 1 and a duration of the digit 0 of 1,000 ms, C the transfer of dial signals with a mark-to-space ratio of 1.3 : 1 and a duration of the digit 0 of 900 ms, and D the transfer of dial signals with a mark-to-space ratio of 1.9 : 1 and a duration of the digit 0 of 1,100 ms.

In each of the four examples, the line *a* shows the signals applied to the input E of the multiplex subscriber circuit, the line *b* the square-wave trains at the output of the divider T, and the line c the signals appearing at the output of the buffer F3. On the lines d and e the values transferred to the transmitter-distributor V are marked, with d and e differing in the position of the time channel in the transmitter-distributor cycle by 10 ms.

As can be seen from the example A, it is appropriate to allow the counter Z1 to count up to the value 7. Then, T = 130 ms have passed since the beginning of the character, this value T lying safely within the range 120<T<140 ms. In the case of teleprinter characters, therefore, the next change of polarity is safe to be a "1 → 0" transition, so that at the next teleprinter character the divider T and the counter Z1 are enabled again via the flip-flop F1, and the cycle repeats.

Figure 3A:
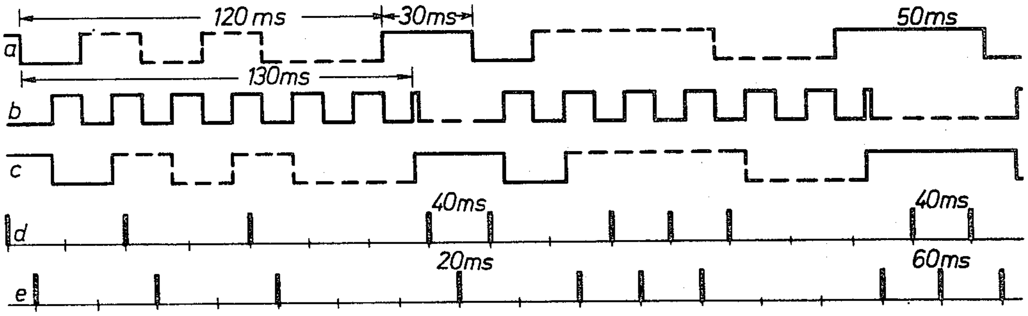
FIGS. 3A, 3B, 3C, and 3D illustrates diagramatically the sequencing of teleprinter characters and of dial signals lying within the tolerances into the transmitter-distributor cycle of a TDM system.
Figure 3B:
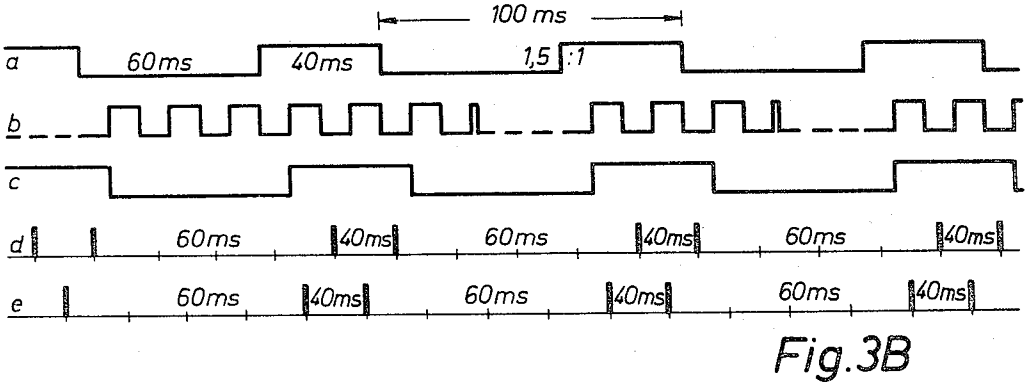
Figure 3C:
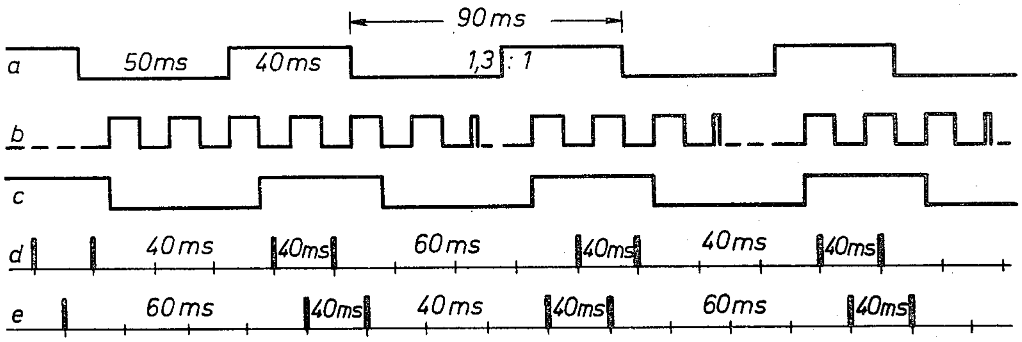
Figure 3D:
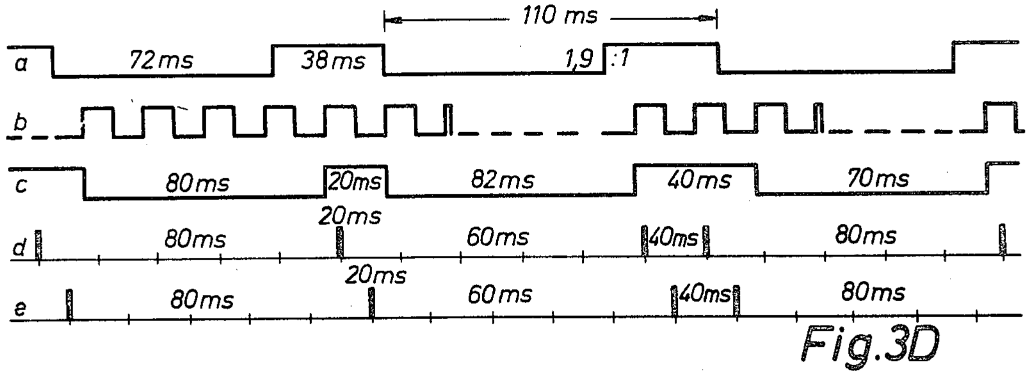

B...D show this cycle for dial signals. Since in this case, too, a "1 → 0" transition occurs at the beginning of the signal, the flip-flop F1 responds and enables the divider T and the counter Z1. After 130 ms from the beginning of the signal, however, all digits except the digit 1 have the state 0 (start state), so that the next change must be a "0 → 1" transition, i.e., the flip-flop F2 responds and enables the divider T and the counter Z2. If the counter Z2 is allowed to count up to the value 4, dial signals will again have the state 0 after each counting value, so that this cycle can repeat until the end of the dial signal according to the digit to be dialed. Thus, as shown in the examples B...D, this counting value 4, i.e., a time T of 70 ms after the "0 → 1" transition, is an appropriate value within all tolerances of the dial. If it is possible to eliminate the duration of the selection of the digit 0 of 900 ms, the counting value 5, i.e. a time T of 90 ms after the "0 → 1" transition, can be used as well. If shortening of the first space of a dial signal to 20 ms as shown in FIG. 3*d*, lines *c*, *d*, and *e*, cannot be permitted, this is avoided in case of this dial-signal length by eliminating the tolerance limit of 1,100 ms for the dial signal 0 or the 1.9 : 1 ratio between the start and the stop element.

Figure 4:
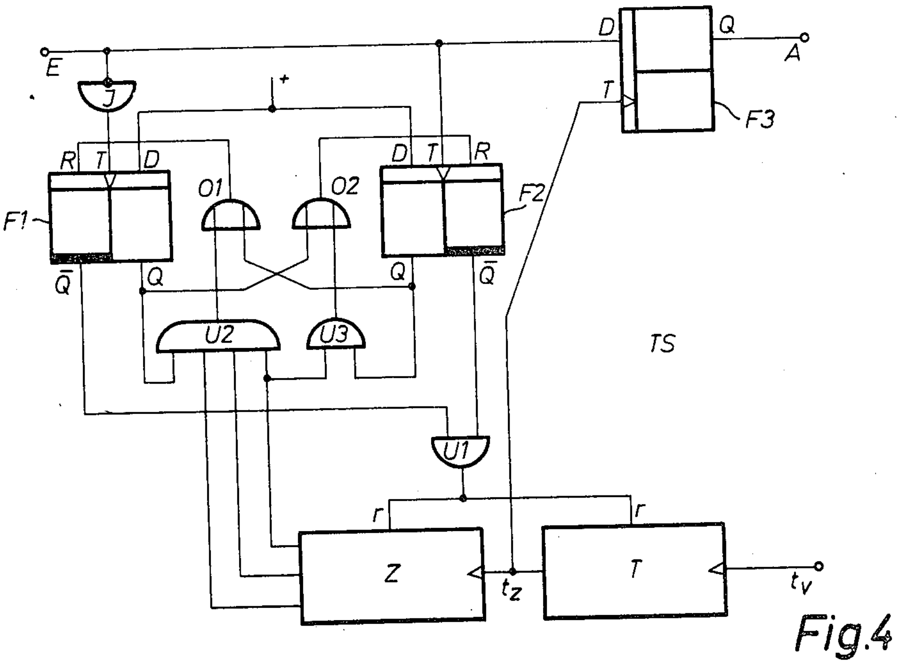
FIG. 4 shows a modification of the circuit of FIG. 2.

FIG. 4 shows a modification of the circuit of FIG. 2. The two counters Z1 and Z2 are replaced by a single counter Z which is presettable to two counting values. Furthermore, the circuit has been modified by using uniform types of flip-flops which are available as integrated circuits with two flip-flops in each case. The use of integrated circuits of the so-called "COS/MOS" series for flip-flops, counters, and dividers is particularly advantageous because of their limited power requirements. As an example, reference is made to RCA's integrated circuits CD4013A, CD4018A, and CD4024A. In FIG. 4, the counting values chosen are again 7 and 4. In particular, this figure shows the extraction of the counting values from the common counter and their assignment to one of the flip-flops F1 or F2. Since only flip-flops responding to a "0 → 1" transition were obtainable in integrated form, an inverter stage J had to be placed ahead of the flip-flop F1.

There are, of course, a number of variants for the realization of the TDM subscriber circuit according to the invention. For example, each of the two flip-flops F1 and F2 may be formed by interconnecting two NAND-circuits, etc. If two integrated circuits with two flip-flops each are used, one circuit will be left over, which is then used for the opposite direction as a receive buffer, which is now shown in the drawings.

While the principles of this invention have been described above in connection with specific apparatus, it is to be understood that this description is made only by way of example and not as a limitation on the scope of the invention as set forth in the objects and features thereof and in the accompanying claims.

We claim:

1. In a time-division-multiplex circuit arrangement including a transmitter-distributor, and a source of multiplex clock rate pulses and incoming dial and teleprinter character signals, a time-division-multiplex subscriber circuit comprising:

means for bit-wise transfer of the teleprinter character and dial signals according to a counting code and into the transmitter-distributor cycle, said transfer means including a buffer for storing the signals at the multiplex clock rate and with a delay, and a counting device for counting the clock rate pulses and ending the setting of the buffer after the counting device has reached a predetermined counting value, whereby said counting value is determined by the direction of the change of polarity of said signals at the beginning of counting.

2. The time-division-multiplex subscriber circuit of claim 1 further including:

a pair of flip-flop devices which respond to changes of polarity of said signals; and a divider for dividing the multiplex clock rate, said divider responsive to one of said two flip-flop devices and wherein said teleprinter character signal repetition controls the clock input of the buffer and the input of the counting device, said one flip-flop device, said counting device and said divider becoming reset when said counting device reaches a predetermined counting value.

3. The time-division-multiplex subscriber circuit according to claim 2 wherein said counting device comprises a pair of first and second counters, the first of which becomes enabled by a response from said first flip-flop to a count of seven and the second counter becomes enabled by a response from the second flip-flop to a count of four.

4. The time-division-multiplex subscriber circuit according to claim 2 wherein the counting device comprises a counter preset to two counting values and is responsive to either of said flip-flops wherein said counter counts to a count of seven in response to a first set of flip-flops and to a count of four upon response from said second flip-flop.

5. The time-division-multiplex subscriber circuit according to claim 4 wherein the counter counts to five upon response from said second flip-flop.

* * * * *